United States Patent
Spata et al.

(10) Patent No.: US 10,997,965 B2
(45) Date of Patent: May 4, 2021

(54) AUTOMATED VOICE PROCESSING TESTING SYSTEM AND METHOD

(71) Applicant: Accenture Global Solutions Limited, Dublin (IE)

(72) Inventors: Gregory Spata, Raleigh, NC (US); Paul M. Barsamian, Glenview, IL (US)

(73) Assignee: Accenture Global Solutions Limited, Dublin (IE)

( * ) Notice: Subject to any disclaimer, the term of this patent is extended or adjusted under 35 U.S.C. 154(b) by 101 days.

(21) Appl. No.: 16/373,359

(22) Filed: Apr. 2, 2019

(65) Prior Publication Data

US 2020/0320975 A1    Oct. 8, 2020

(51) Int. Cl.
*G10L 15/01* (2013.01)
*G10L 15/22* (2006.01)
*G10L 13/00* (2006.01)

(52) U.S. Cl.
CPC .............. *G10L 15/01* (2013.01); *G10L 13/00* (2013.01); *G10L 15/22* (2013.01); *G10L 2015/223* (2013.01)

(58) Field of Classification Search
CPC ......... G10L 15/01; G10L 13/00; G10L 15/22; G10L 2015/223
USPC ....................................................... 704/251
See application file for complete search history.

(56) References Cited

U.S. PATENT DOCUMENTS

| | | |
|---|---|---|
| 5,715,369 A | 2/1998 | Spoltman et al. |
| 7,742,919 B1 | 6/2010 | Davis et al. |
| 8,126,720 B2 | 2/2012 | Nakagawa et al. |
| 8,260,617 B2 | 9/2012 | Dhanakshirur et al. |
| 9,349,365 B2 | 5/2016 | Rajagopal et al. |
| 9,396,721 B2 | 7/2016 | Agapi et al. |
| 2006/0224392 A1* | 10/2006 | Kershaw ................. G10L 15/28 704/270.1 |

(Continued)

OTHER PUBLICATIONS

Manuela Boros et al. "Towards Understanding Spontaneous Speech : Word accuracy vs. Concept Accuracy" Proceeding of Fourth International Conference on Spoken Language Processing (ICSLP); published Oct. 6, 1996.

(Continued)

*Primary Examiner* — Paras D Shah
*Assistant Examiner* — Nicole A Kotulak
(74) *Attorney, Agent, or Firm* — Plumsea Law Group, LLC

(57) ABSTRACT

An automated testing system and method for evaluating voice processing systems is provided. In one embodiment, a method includes receiving a plurality of voice command inputs and a plurality of expected responses associated with the voice command inputs. A text-to-speech engine is applied to the voice command inputs to generate test command audio files. The test command audio files are provided to a testing apparatus in communication with a voice processing system. A generated response output from the voice processing system is obtained for each of the test command audio files. The generated response is captured from the testing apparatus using a sensor to detect audio and/or visual information. The obtained generated response is compared to an expected response from the plurality of expected responses for each of the test command audio files. Based on the comparison, a test result is provided for each of the voice command inputs.

20 Claims, 6 Drawing Sheets

(56) References Cited

U.S. PATENT DOCUMENTS

2014/0303756 A1* 10/2014 Tarnutzer ............ G06F 11/3688
    700/83
2019/0324925 A1* 10/2019 Toyoda ................... G06F 3/167

OTHER PUBLICATIONS www.forbes.com/sites/forbestechcouncil/2018/06/08/the-hyper-adoption-of-voice-technology/#43590b867058 [retrieved on Jul. 17, 2019].
reflektion.com/practical-ai-natural-language-processing-voice-commerce/ [retrieved on Jul. 17, 2019].
www.tractica.com/newsroom/press-releases/natural-language-processing-market-to-reach-22-3-billion-by-2025/ [retrieved on Jul. 17, 2019].

* cited by examiner

AUTOMATED VOICE PROCESSING TESTING SYSTEM AND METHOD

TECHNICAL FIELD

The present disclosure generally relates to natural language voice processing systems. More specifically, the present disclosure generally relates to an automated testing system and method for evaluating voice processing systems.

BACKGROUND

A growing number of vendors are offering products that include artificially intelligent voice processing systems using Natural Language Processing (NLP) algorithms. Generally, these products are configured to accept an audio command, either directly from a device's microphone or via an application programming interface (API) that receives a digitized recording of a user's voice. These recorded utterances are then converted to text, the intent of these utterances are determined, and the voice processing system responds with the intent or a designated response/action.

Modern products implementing NLP typically do not require voice training before use and can generally support a wide range of speed characteristics. Examples of voice processing systems include Amazon's Alexa, Apple's Siri, IBM's Watson, and other personal assistants and/or products incorporating NLP algorithms.

Voice-based search queries are the fastest-growing mobile search type. Forecasts estimate that half of all searches will be performed via voice by 2020. In the United States alone, 67 million voice-assisted devices will be in use by 2019. As a result of this growth, as well as advances in newly developed artificial intelligence technologies, significant expansion in the market for NLP software solutions is expected over the next few years.

SUMMARY

With the predicted rise in NLP software and products integrating voice processing systems, there is a need for improved voice processing testing systems. Conventional voice processing testing solutions generally rely on a highly manual process for evaluating the effectiveness of NLP algorithms. Such conventional solutions suffer from several drawbacks. For example, conventional voice processing testing solutions can be inconsistent. Voice processing can be greatly influenced by a number of factors, including background noise, voice characteristics, microphone characteristics, environment, and other influences. Achieving consistency across test cases is extremely difficult because of the potential for unknown influencing factors being introduced with each test attempt.

Additionally, conventional testing solutions can be inefficient. Manual repetition of test cases is challenging because it requires significant time and effort. Furthermore, thorough testing requires consideration of a range of factors, which requires manual operators to repeat functional test cases with various scenarios taking into account combinations of different factors. Testing also requires the test operator to be creative and consider all the different ways that a user could arrange and structure words to result in a given intent. Some valid potential test cases can easily be overlooked. Iterating through all the combinations for the various background, voice, and environmental conditions for each test case is often not performed by manual operators, resulting in incomplete testing.

The example embodiments provide an automated testing system and method for evaluating voice processing systems that offers improved consistency, time savings, and completeness over conventional testing solutions. The techniques presented herein can generate consistent audio files for testing without introducing unintentional human bias. The automated testing system of the example embodiments fully automates the test execution of a voice processing system without human intervention. New test cases are automatically created to test for a variety of different conditions and different combinations of conditions, including simulating variations in background noise, voice, and environmental conditions. Users of the automated testing system described herein can run the fully automated solution or can manually replay specific test cases as needed to test specific items/commands.

The techniques presented herein can help accelerate the training of an artificially intelligent voice processing system. Additionally, the described techniques are agnostic to any voice processing system, application, or platform. For example, the example embodiments may be used with voice processing systems that are embedded in devices or vehicles, available through mobile devices, on the internet, native desktop, etc.

In one aspect, the invention provides a computer-implemented method for testing a voice processing system, the method comprising: receiving a plurality of voice command inputs and a plurality of expected responses associated with the plurality of voice command inputs; applying a text-to-speech engine to the plurality of voice command inputs to generate a plurality of test command audio files; providing the plurality of test command audio files to a testing apparatus in communication with a voice processing system; obtaining, from the testing apparatus, a generated response output from the voice processing system for each of the plurality of test command audio files, wherein the generated response is captured from the testing apparatus using at least one sensor configured to detect audio and/or visual information from the testing apparatus; comparing the obtained generated response to an expected response from the plurality of expected responses for each of the plurality of test command audio files; and based on the comparison, providing a test result for each of the plurality of voice command inputs.

In another aspect, a system for testing a voice processing system is provided, the system comprising: at least one sensor configured to detect audio and/or visual information from a testing apparatus; a memory; and a processor in communication with the at least one sensor and the memory, wherein the processor is configured to: receive a plurality of voice command inputs and a plurality of expected responses associated with the plurality of voice command inputs; apply a text-to-speech engine to the plurality of voice command inputs to generate a plurality of test command audio files; provide the plurality of test command audio files to the testing apparatus in communication with a voice processing system; obtain, from the testing apparatus, a generated response output from the voice processing system for each of the plurality of test command audio files, wherein the generated response is captured from the testing apparatus using the at least one sensor; compare the obtained generated response to an expected response from the plurality of expected responses for each of the plurality of test command audio files; and based on the comparison, provide a test result for each of the plurality of voice command inputs.

In another aspect, one or more non-transitory computer readable storage media encoded with instructions are provided that, when executed by a processor of a voice processing testing system, causes the processor to: receive a plurality of voice command inputs and a plurality of expected responses associated with the plurality of voice command inputs; apply a text-to-speech engine to the plurality of voice command inputs to generate a plurality of test command audio files; provide the plurality of test command audio files to a testing apparatus in communication with a voice processing system; obtain, from the testing apparatus, a generated response output from the voice processing system for each of the plurality of test command audio files, wherein the generated response is captured from the testing apparatus using at least one sensor configured to detect audio and/or visual information from the testing apparatus; compare the obtained generated response to an expected response from the plurality of expected responses for each of the plurality of test command audio files; and based on the comparison, provide a test result for each of the plurality of voice command inputs.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Many voice processing systems employ artificially intelligent engines that are used by application developers to allow them to evaluate and refine the effectiveness of intent determination through testing. These systems often require a significant amount of training to reduce errors associated with intent determination. Typically, the systems are deployed into production and use interactions for the purposes of training. However, this can lead to negative initial user experiences that result in poor reviews and under-realized adoption or revenue. Therefore, there is a need for a more effective training solution to avoid poor initial user experience. The example embodiments described herein provide a system and method for training artificial intelligence engines for voice processing systems.

Figure 1:
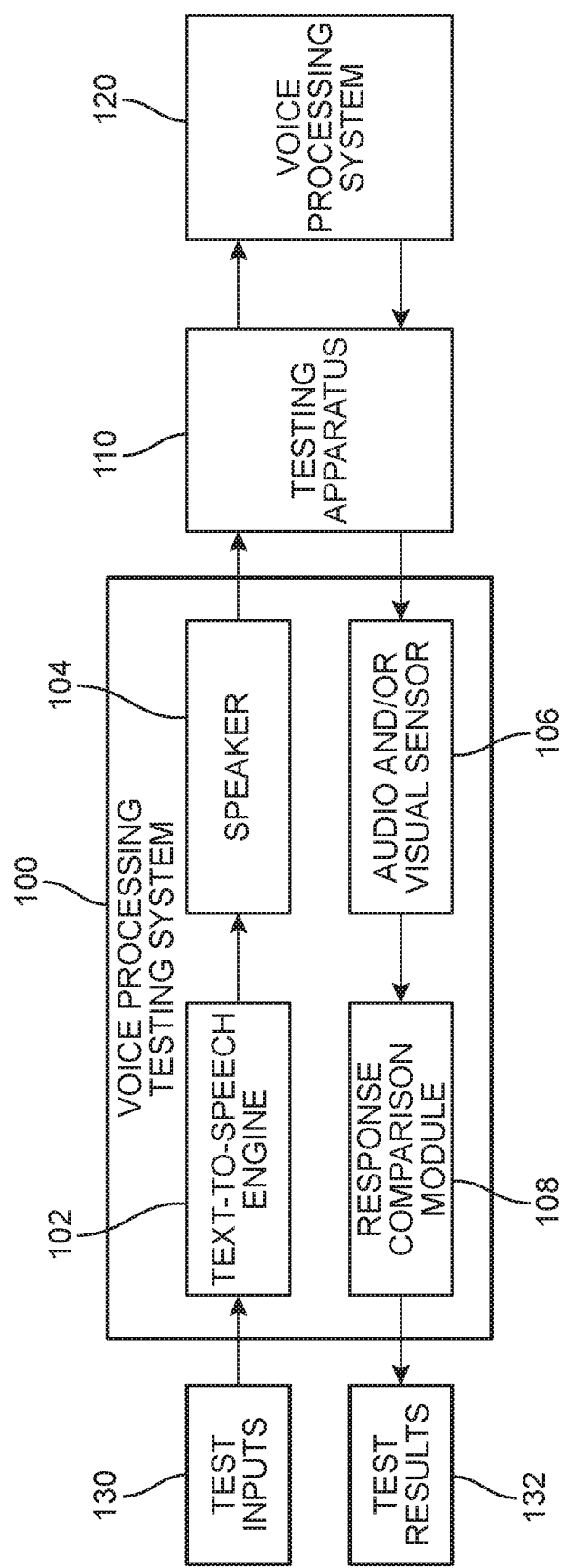
FIG. 1 illustrates a schematic view of an example embodiment of a system for testing a voice processing system.

Referring now to FIG. 1, an example embodiment of a voice processing testing system 100 is shown. Voice processing testing system 100 is configured to be used in combination with a testing apparatus 110 for evaluating a voice processing system 120. According to the principles of the embodiments described herein, voice processing testing system 100 may be used with any of a variety of different voice processing systems. For example, a number of different companies currently offer voice processing systems, such as Alexa from Amazon, Siri from Apple, Google Assistant, Watson from IBM, and others. Accordingly, voice processing testing system 100 is agnostic with regard to the specific implementation of voice processing system 120.

In an example embodiment, voice processing testing system 100 includes at least a text-to-speech engine 102, a speaker 104, an audio and/or visual sensor 106, and a response comparison module 108. Text-to-speech engine 102 is a test audio generator that is configured to receive test inputs 130 and generate a plurality of test command audio files. Test inputs 130 include a plurality of voice command inputs (i.e., the commands for the voice processing system to be tested) and a plurality of expected responses associated with the plurality of voice command inputs (i.e., the result that is expected to be output by the voice processing system for a command).

In some embodiments, test inputs 130 may be provided by a vendor, user, and/or tester of voice processing testing system 100. Additionally, test inputs 130 may be specific to the particular voice processing system that is being tested. In other embodiments, test inputs 130 may include a set of generic or commonly used voice command inputs along with the expected responses.

In an example embodiment, text-to-speech engine 102 generates the plurality of test command audio files using one or more resources to provide different variations of each voice command input. For example, each voice command input may be varied by in different ways by substituting one or more words associated with the voice command input, adding an audio overlay that includes different types and/or levels of background noise, and/or by applying various types of analog signal processing to the test command audio file to change or modify at least one audio characteristic. As a result of the different variations and combinations of variations, each voice command input can be associated with a plurality of test command audio files generated by test-to-speech engine 102 for that voice command input. In some cases, a single voice command input may result in tens or hundreds of different test command audio files.

Once the test command audio files have been generated by text-to-speech engine 102, each test command audio file is output one at a time through speaker 104. Speaker 104 provides an analog output from voice processing testing system 100 to testing apparatus 110 that simulates a human speaker. That is, by providing test command audio files that are played through speaker 104 and captured or listened to by testing apparatus 110, voice processing testing system 100 interacts with testing apparatus 110 and voice processing system 120 in a similar manner as an actual user or consumer.

In some embodiments, testing apparatus 110 may be any application or device that is configured to provide an interface between voice processing system 120 and a user. For example, testing apparatus 110 can include a smart speaker, computer, mobile phone or tablet, interactive chat bot, telephone service, automobile voice command system, voice assistive service, or other natural language processing services or systems. Testing apparatus 110 captures or listens to the test command audio files that are played through speaker 104 and generates an application programming interface (API) call or connection to voice processing system 120.

Voice processing system 120 receives the captured test command audio files from testing apparatus 110 and analyzes the intent of the command. Based on the intent determined from the test command audio file, voice processing system 120 generates a response and sends that response back to testing apparatus 110. Depending on the type of command and/or the type of testing apparatus, the response provided by voice processing system 120 to testing apparatus 110 may take different forms. For example, the response may be provided in audio format, visual format, such as an image or video, or a combination of both.

In an example embodiment, voice processing testing system 100 includes audio and/or visual sensor 106 that is configured to capture the generated response from testing apparatus 110. That is, audio and/or visual sensor 106 is physically separated from testing apparatus 110 and detects audio and/or visual information from testing apparatus 110. For example, in cases where the generated response is in an audio format, audio and/or visual sensor 106 of voice processing testing system 100 may include a microphone configured to capture the audio response from testing apparatus 110. In cases where the generated response is in visual format, audio and/or visual sensor 106 of voice processing testing system 100 may include a camera configured to capture the visual response from testing apparatus 110. With this arrangement, voice processing testing system 100 may be used with a variety of different testing apparatuses and can capture generated responses in multiple formats.

Captured responses obtained from audio and/or visual sensor 106 may then be compared to the plurality of expected responses by response comparison module 108. As described above, the plurality of expected responses may be initially provided with test inputs 130. Additionally, in some embodiments, voice processing testing system 100 may apply machine learning techniques to the plurality of expected responses to generate additional acceptable responses. Response comparison module 108 determines whether the generated response matches the expected response for the voice command input and generates an output of test results 132 for each of the test command audio files. Test results 132 may be in the form of indicating that a result is a correct result or an incorrect result. Accordingly, voice processing testing system 100 may be used to evaluate the effectiveness of voice processing system 120.

Figure 2:
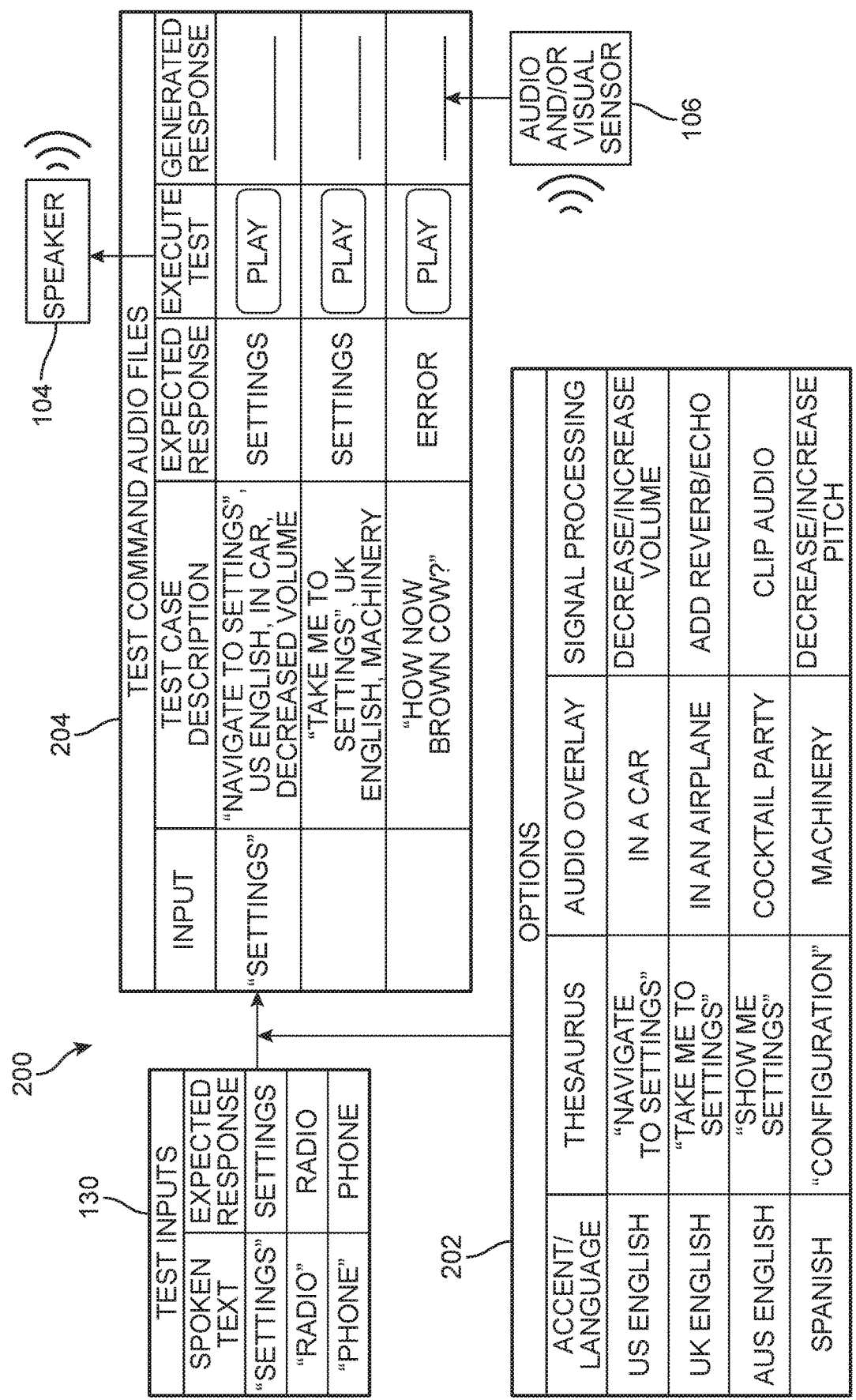
FIG. 2 illustrates a representative view of an example embodiment of a process for generating audio test files for a voice processing testing system.

FIG. 2 illustrates a representative view of an example embodiment of a process 200 for generating audio test files for voice processing testing system 100. In an example embodiment, process 200 may be implemented by text-to-speech engine 102, described above. In this embodiment, process 200 for generating audio test files includes receiving a plurality of test inputs 130, which include voice command inputs and associated expected responses. For example, as shown in FIG. 2, test inputs 130 include a voice command input for "Settings" with an expected response of "Settings", a voice command input for "Radio" with an expected response of "Radio", and a voice command input for "Phone" with an expected response of "Phone". It should be understood that test inputs 130 shown in FIG. 2 are exemplary and additional voice command inputs and expected responses may be provided.

In this embodiment, process 200 includes text-to-speech engine 102 generating a plurality of test command audio files 204 using one or more resources to provide different variations of each voice command input from test inputs 130. For example, each voice command input may be varied using one or more options 202. Options 202 may include different accents or languages, substituted words based on a thesaurus or other list of synonyms or alternate phrases, audio overlays of different types and/or levels of background noise, and variations of analog signal processing.

In this embodiment, some variations for options 202 include different languages or accents, for example, U.S. English, U.K. English, Australian (AUS) English, Spanish, as well as other accents and/or languages. Some variations for options 202 include substituted words based on a thesaurus or other list of synonyms or alternate phrases. A user may request "Settings" in different ways, for example, as shown in this embodiment, saying "Navigate to Settings", "Take Me to Settings", "Show Me Settings", "Configuration", or other similar phrasings are intended by the user to get access to a Settings or similarly-named menu. Options 202 may also include a number of different audio overlays, such as background noise of being in a car, in an airplane, at a cocktail party, in the presence of loud machinery, or other kinds of typical background noises. Additionally, options 202 may also include various types of analog signal processing, such as changes in volume or pitch, adding echo or reverberation, or other distortion effects that may be simulated for a speaker or microphone. It should be understood that additional variations and combinations may be generated beyond the examples shown in FIG. 2 for options 202.

Once options 202 are added to each voice command input from test inputs 130, plurality of test command audio files 204 are generated. For example, in this embodiment, a first voice command input (i.e., "Settings") may have options 202 applied to generate a first test command audio file that includes the phrase "Navigate to Settings" in U.S. English with an audio overlay of background noise from inside of a car and at a decreased volume. The first voice command input may also have a different combination of options 202 applied to generate a second test command audio file that includes the phrase "Take Me to Settings" in U.K. English with an audio overlay of background noise that includes machinery sounds. Both the first test command audio file and the second test command audio file have an expected response of "Settings". That is, the expected response from the voice processing system being tested is to provide the user with the Settings menu.

Additionally, in this embodiment, plurality of test command audio files 204 may include at least one nonsense command that is intended to generate a negative or error expected response. As shown in FIG. 2, a third test command audio file includes the phrase "How Now Brown Cow?" that has an expected response of "Error" or other inconclusive response. That is, evaluation and testing of a voice processing system may include testing how it handles or responds to voice command inputs that do not make sense or for which the system does not have an expected response.

After generating plurality of test command audio files 204 from test inputs 130, process 200 may include executing the testing. For example, as shown in this embodiment, each test command audio file from plurality of test command audio files 204 may be played or output via speaker 104. The output from speaker 104 may be received by the testing apparatus in communication with the voice processing system that is being tested. For example, as shown in FIG. 1 above, testing apparatus 110 may capture the test command audio file played or output via speaker 104 and send the captured audio to voice processing system 120.

Voice processing system 120 evaluates the intent of the command and generates a response that is sent to testing apparatus 110. Audio and/or visual sensor 106 of voice processing testing system 100 may then capture the generated response associated with each test command audio file from testing apparatus 110. For example, audio and/or visual sensor 106 is configured to capture audio and/or visual information associated with the generated response output by testing apparatus 110. The captured generated responses may then be compared with the expected result for each test command audio file of plurality of test command audio files 204 by response comparison module 108 of voice processing testing system 100.

Figure 3:
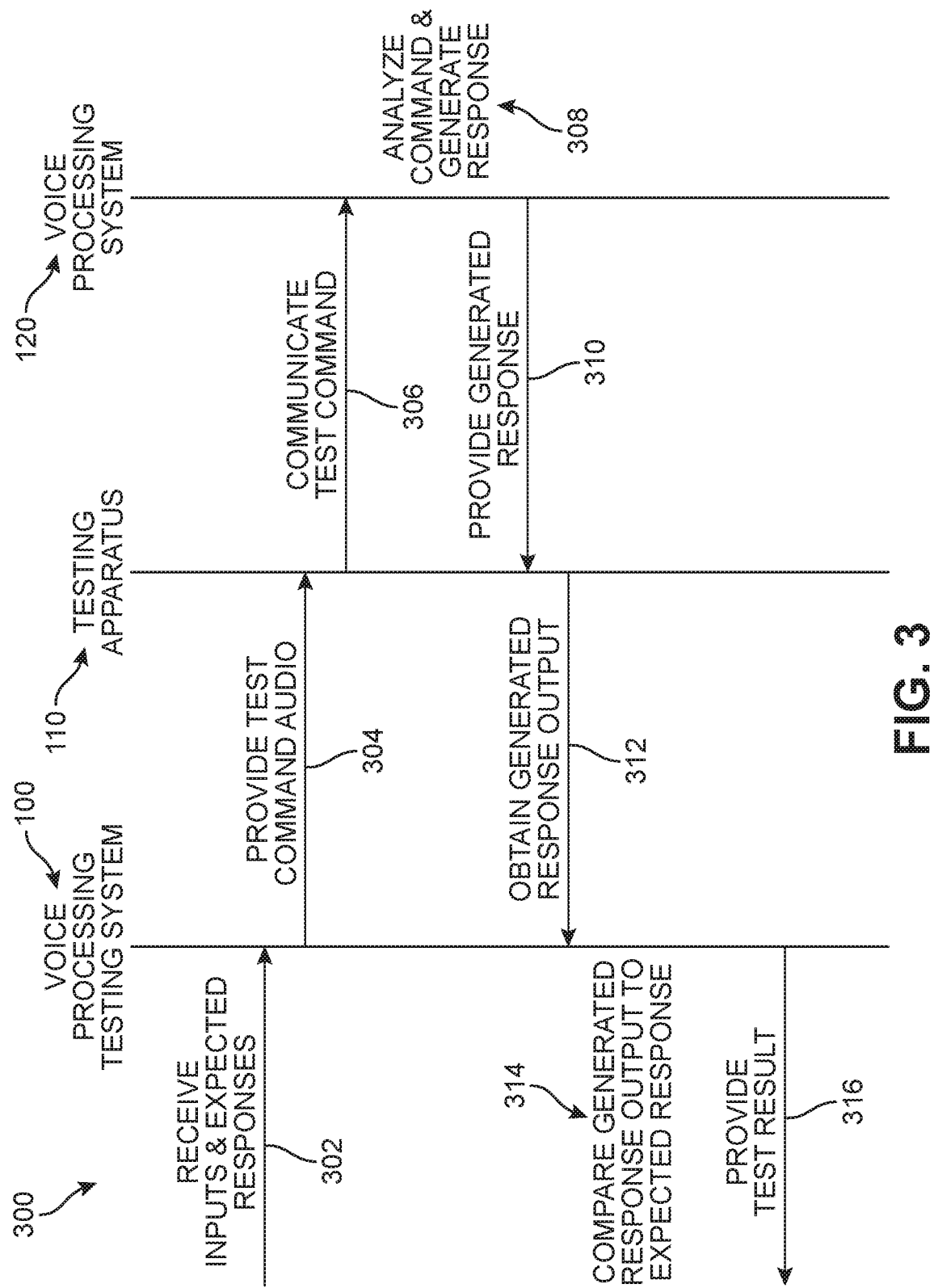
FIG. 3 illustrates a schematic view of an example embodiment of a process for testing a voice processing system.

Referring now to FIG. 3, a schematic view of an example embodiment of a process 300 for testing voice processing system 120 is shown. In this embodiment, process 300 is represented by a ladder diagram to illustrate the operations performed by the different components during a testing session. As shown in FIG. 3, process 300 for testing voice processing system 120 may include an operation 302 where voice processing testing system 100 receives the plurality of voice command inputs and the associated plurality of expected responses (e.g., test inputs 130). Next, process 300 includes an operation 304 where one or more test command audio files are provided from voice processing testing system 100 to testing apparatus 110. For example, test command audio files provided at operation 304 may be generated according to process 200 described above to generate multiple different variations for each voice command input.

Next, process 300 includes an operation 306 where testing apparatus 110 communicates the test command to voice processing system 120. Upon receiving the test command, voice processing system 120 analyzes the command and generates a response at an operation 308. At operation 308, the generated response is based on voice processing system 120 determining the intent of the command. Voice processing system 120 then provides the generated response back to testing apparatus 110 at an operation 310. Next, voice processing testing system 100 obtains the generated response output from testing apparatus 110 at an operation 312. For example, operation 312 may include obtaining the generated response using audio and/or visual sensor 106 to capture the output from testing apparatus 110.

Upon obtaining the generated response from testing apparatus 110, at an operation 314 voice processing testing system 100 compares the generated response output to the expected response for the voice command input associated with the test command audio file that was used for testing from operation 304. Based on the comparison performed at operation 314, voice processing testing system 100 may then provide a test result at an operation 316. In one embodiment, the test result at operation 316 may be in the form of indicating that the generated response is a correct result (i.e., the generated response matches the expected result) or is an incorrect result (i.e., the generated response does not match the expected result).

In this embodiment, process 300 for testing voice processing system 120 is shown for a single iteration. It should be understood that process 300 can be repeated for each test command audio file of the plurality of test commend audio files that are generated based on the plurality of voice command inputs. In some embodiments, process 300 may be iterated hundreds of times or more during a testing session of a voice processing system.

Figure 4:
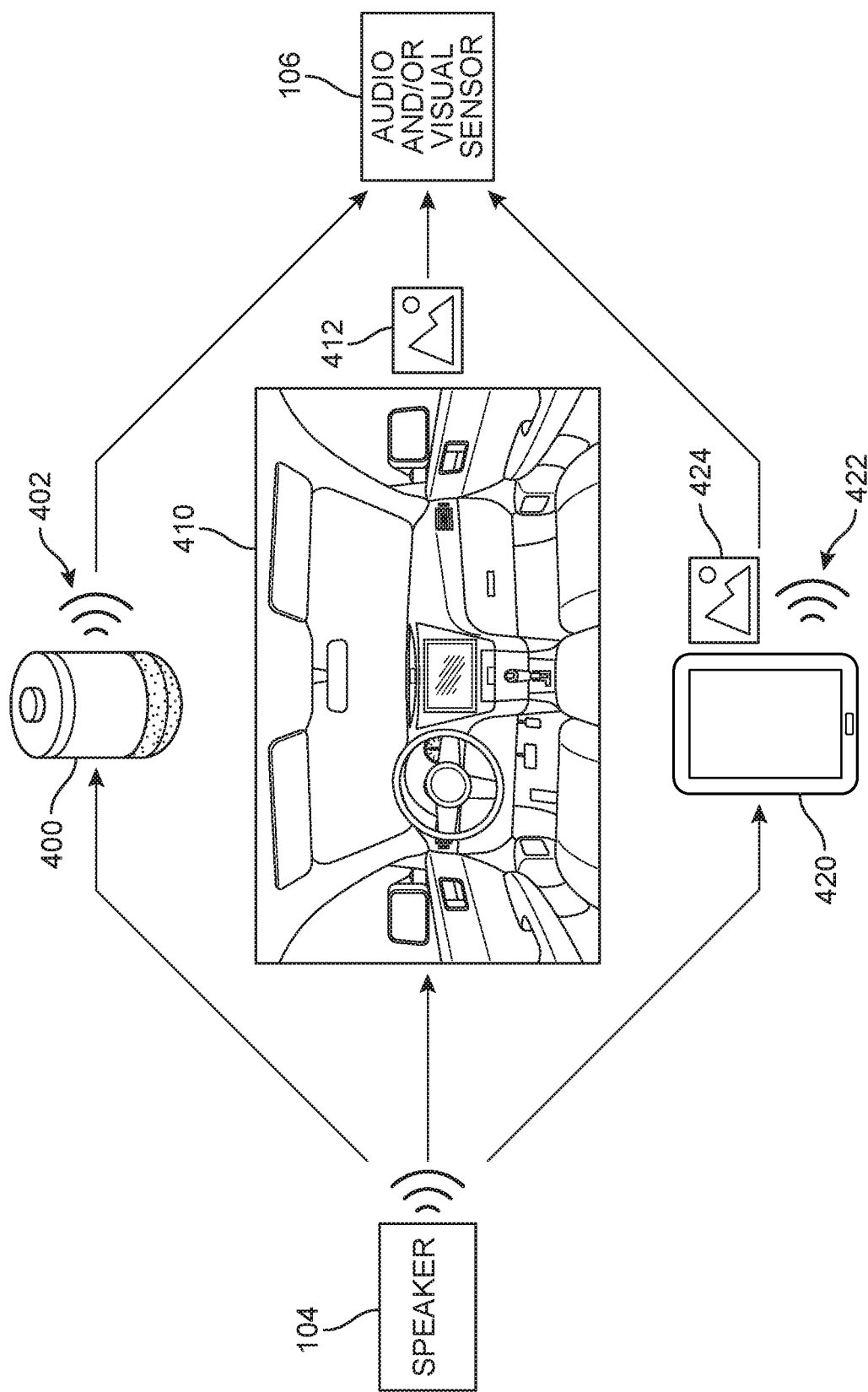
FIG. 4 illustrates a representative view of an example embodiment of a process of using a testing apparatus in communication with a voice processing system.

Referring now to FIG. 4, a representative view of an example embodiment of a process of using a testing apparatus in communication with a voice processing system is shown. In this embodiment, different examples of a testing apparatus that may be used as testing apparatus 110 are provided to communicate with voice processing system 120. As shown in FIG. 4, a test command audio file may be played or output from speaker 104 of voice processing testing system 100. Each example of testing apparatus 110 shown in FIG. 4 is configured to receive the test command audio file from speaker 104, for example, using a microphone.

In some embodiments, different types of testing apparatus 110 may be configured to output the generated response from voice processing system 120 in different formats. For example, a first embodiment of testing apparatus 110 in the form of a smart speaker 400 is configured to receive the test command audio file from speaker 104 and output the generated response from voice processing system 120 in an audio format 402. The audio format 402 of the generated response from smart speaker 400 is obtained or captured by audio and/or visual sensor 106 of voice processing testing system 100.

A second embodiment of testing apparatus 110 in the form of an automobile hands-free system 410 is also configured to receive the test command audio file from speaker 104. Automobile hands-free system 410 may output the generated response from voice processing system 120 in a visual format 412 instead of an audio format, as in the case with smart speaker 400. For example, as shown in FIG. 4, automobile hands-free system 410 may output the generated response on a display screen or other visual interface. The visual format 412 of the generated response from automobile hands-free system 410 is obtained or captured by audio and/or visual sensor 106 of voice processing testing system 100. Visual format 412 may include pictures, images, clips, videos, or other information that can be captured using a camera or other visual sensor.

Additionally, in some embodiments, a testing apparatus may be configured to provide the generated response in multiple formats. A third embodiment of testing apparatus 110 in the form of a mobile device 420, such as a phone or tablet, is configured to receive the test command audio file from speaker 104. Mobile device 420 may output the generated response from voice processing system 120 in an audio format 422, a visual format 424, or both. The audio format 422 and/or the visual format 424 of the generated response from mobile device 420 is obtained or captured by audio and/or visual sensor 106 of voice processing testing system 100. In other embodiments, voice processing testing system 100 may be provided with other types of sensors to capture or obtain generated responses from a testing apparatus that outputs the generated response from voice processing system 120 in different formats, such as haptic or tactile feedback or other formats.

With this configuration, because voice processing testing system 100 uses audio and/or visual sensor 106 to capture or obtain generated responses from testing apparatus 110 in a variety of formats, voice processing testing system 100 is generically compatible with any type or implementation of a voice processing system. That is, voice processing testing system 100 is agnostic to any specific voice processing system and does not require use of proprietary protocols or programming languages that may be associated with a particular voice processing system. Additionally, because audio and/or visual sensor 106 is physically separate from testing apparatus 110, voice processing testing system 100 can obtain or capture the generated response from different types or forms of testing apparatuses that may output the response using different formats.

In some embodiments, voice processing testing system 100 may be further used to track response time performance of a voice processing system, for example, voice processing system 120. In these embodiments, a timestamp associated with a test command audio file played or output from speaker 104 of voice processing testing system 100 is saved. When a generated response from voice processing system 120 to the test command audio file is received at voice processing testing system 100 from testing apparatus 110, a timestamp associated with the response is saved. Based on the time difference between the two timestamps, a measurement of the response time performance of voice processing system 120 may be determined.

Because voice processing testing system 100 and testing apparatus 110 are physically separate (i.e., spaced apart by an air gap), the response time performance determined in this manner provides a true measurement of the performance of voice processing system 120 from the perspective of a user. This may also include taking into account factors such as the time it takes the voice processing system to complete output of the generated response (e.g., via audio and/or visual formats) and navigation of any applicable display screens.

The response time performance measurement of the present embodiment differs from conventional voice processing system or NLP testing methods because voice processing testing system 100 does not rely on a digital response of voice processing system 120. Instead, voice processing testing system 100 will determine response time performance from the perspective of an actual user of voice processing system 120. With this arrangement, a voice processing system may be checked to ensure that it is consistently responding fast enough to provide a positive user experience. Additionally, the response time performance measurement described herein may also be used by developers to determine changes to the configuration of voice processing system 120 to accelerate certain generated responses.

Figure 5:
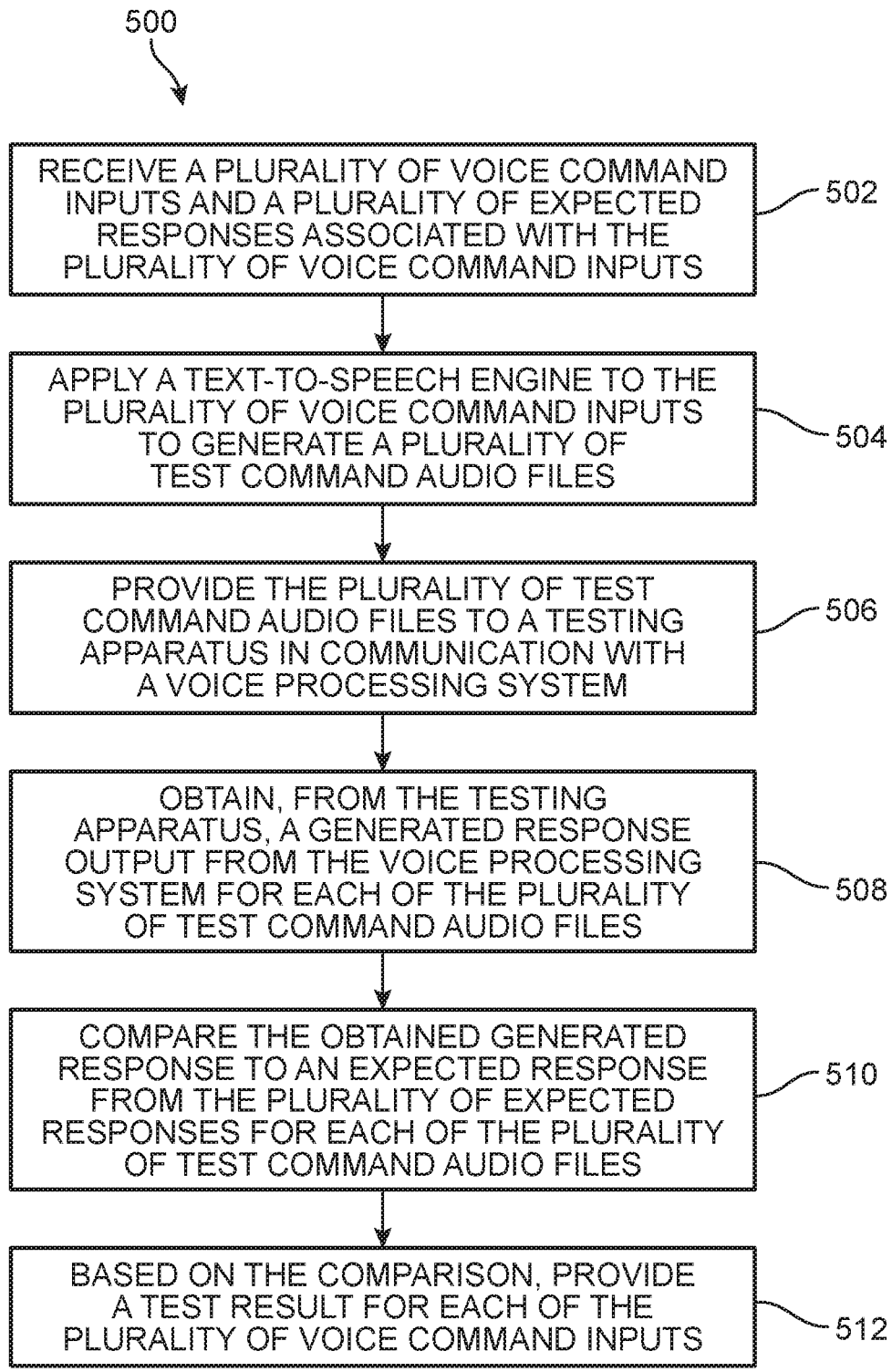
FIG. 5 illustrates a flowchart of an example embodiment of a method for evaluating a voice processing system.

Referring now to FIG. 5, a flowchart of an example embodiment of a method 500 for evaluating a voice processing system is shown. In an example embodiment, method 500 may be implemented using voice processing testing system 100, described above. In this embodiment, method 500 may begin at an operation 502, where a plurality of voice command inputs and a plurality of expected responses associated with the plurality of voice command inputs are received. For example, voice processing testing system 100 may receive test inputs 130, as shown in FIG. 1, at operation 502.

Next, method 500 includes an operation 504, where a text-to-speech engine is applied to the plurality of voice command inputs to generate a plurality of test command audio files. For example, text-to-speech engine 102 may implement process 200, shown in FIG. 2, to generate a plurality of test command audio files that include different variations of each voice command input. In some embodiments, operation 504 may include generating variations for the plurality of test command audio files by substituting one or more words associated with a voice command input, adding an audio overlay including background noise to a test command audio file, and/or applying analog signal processing to a test command audio file to change or modify at least one characteristic of the test command audio file.

Upon generating the plurality of test command audio files, method 500 may proceed to an operation 506, where the plurality of test command audio files are provided to a testing apparatus in communication with a voice processing system. For example, as shown in FIG. 1, a test command audio file may be output via speaker 104 to be received by testing apparatus 110 in communication with voice processing system 120.

Next, at an operation 508, method 500 includes obtaining, from the testing apparatus, a generated response output from the voice processing system for each of the plurality of test command audio files. For example, as described above, voice processing testing system 100 may use audio and/or video sensor 106 to capture or obtain the generated response from voice processing system 120 that is output by testing apparatus 110.

Upon obtaining the generated responses from operation 508, method 500 may proceed to an operation 510. At operation 510, each obtained generated response is compared to an expected response from the plurality of expected responses for each of the plurality of test command audio files. For example, response comparison module 108 of voice processing testing system 100 may compare the generated response for a voice command input associated with a test command audio file to the expected response for that voice command input. Additionally, in some embodiments, operation 510 may include applying machine learning techniques to the plurality of expected responses to generate additional acceptable responses.

Based on the comparison made at operation 510, method 500 may proceed to an operation 512. At operation 512, a test result is provided based on the comparison for each of the plurality of voice command inputs. For example, as shown in FIG. 1, test results 132 may be provided to a user of voice processing testing system 100 to evaluate the effectiveness of voice processing system 120. In some embodiments, the test result output at operation 512 may be in the form of indicating a correct result or an incorrect result. In other embodiments, the test result may be in the form of a percentage or rate of correctness versus incorrectness.

Method 500 may continue for a fixed duration or until each of the plurality of test command audio files has been tested. Additionally, method 500 may be iterated multiple times. With this arrangement, method 500 provides an evaluation of the effectiveness of a voice processing system.

Figure 6:
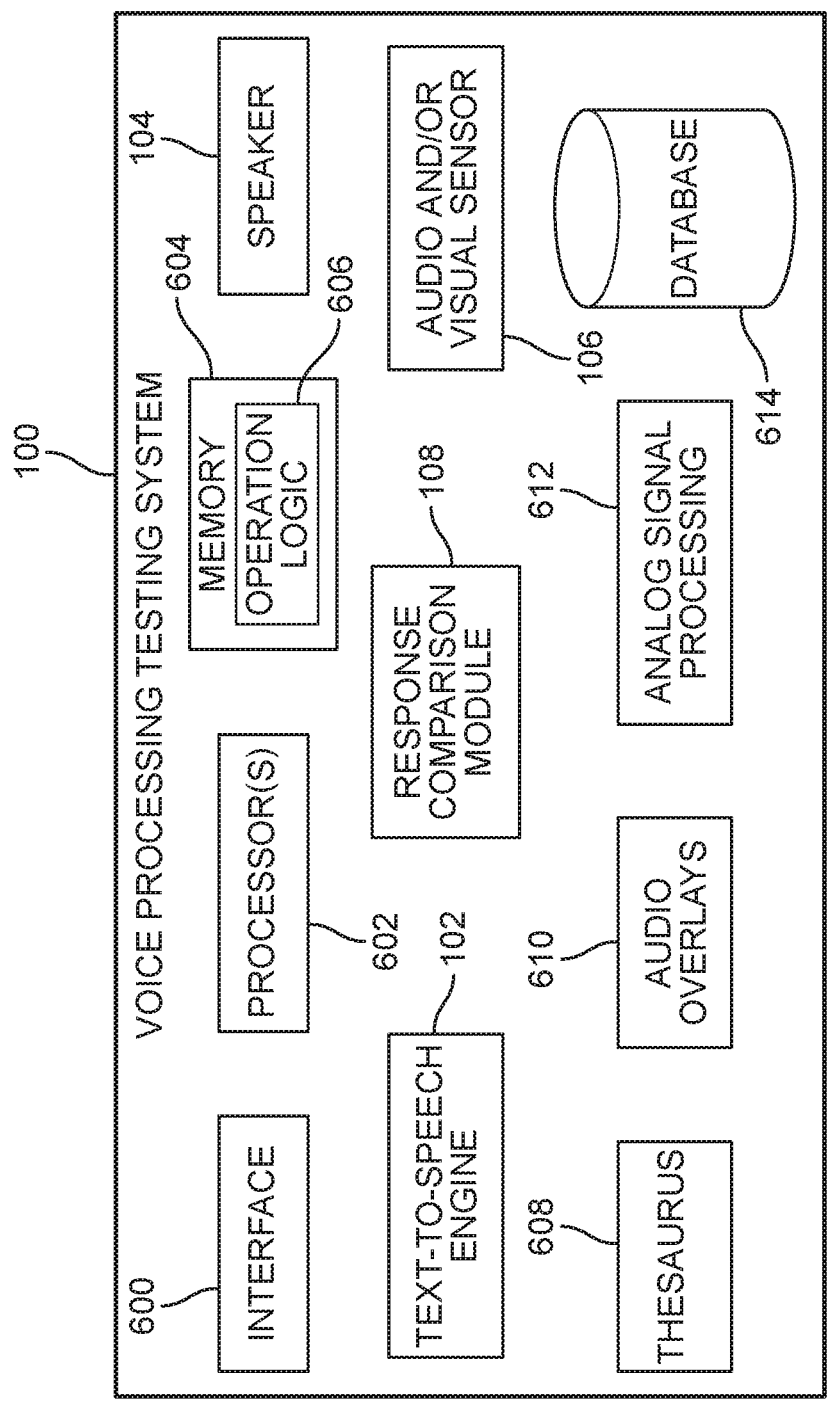
FIG. 6 illustrates a schematic view of an example embodiment of a voice processing testing system.

FIG. 6 illustrates a schematic view of an example embodiment of voice processing testing system 100. The various techniques according to the embodiments described herein may be implemented in hardware, software, or a combination thereof. In an example embodiment, voice processing testing system 100 is configured to perform the operations described above and depicted in connection with FIGS. 1-5. In this embodiment, voice processing testing system 100 includes text-to-speech engine 102, speaker 104, audio and/or visual sensor 106, and response comparison module 108, as described above in reference to FIG. 1. Additionally, in some embodiments, voice processing testing system 100 may further include an interface 600, one or more processors 602, memory 604, and a database 614.

Interface 600 may be any type of interface that allows a user of voice processing testing system 100 to interact with the system. For example, interface 600 may assist with receiving test inputs 130 and/or providing test results 132. In some embodiments, interface 600 may include one or more input devices, such as a keyboard or mouse, and one or more output devices, such as a display. Processor 602 may be a microprocessor or microcontroller configured to implement operations associated with functions of voice processing testing system 100.

Processor 602 executes instructions associated with software stored in memory 604. Specifically, memory 604 stores instructions for various control logic that, when executed by the processor 602, causes processor 602 to perform various operations on behalf of voice processing testing system 100 as described herein. In this embodiment, memory 604 includes at least operation logic 606. Operation logic 606 may be configured to implement various operations associated with functions of voice processing testing system 100, including operations associated with process 200, process 300, and/or method 500, described above. In addition, in some embodiments, one or more of text-to-speech engine 102 and response comparison module 108 may be implemented in hardware, software, or a combination of both. In embodiments including software, operation logic 606 may further include instructions to perform the operations associated with text-to-speech engine 102 and/or response comparison module 108, as described herein.

Memory 604 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, memory 604 may comprise one or more tangible (non-transitory) computer readable storage media (e.g., a memory device) encoded with software comprising computer executable instructions and when the software is executed (by the processor 602) it is operable to perform operations described herein.

As described above, in some embodiments, text-to-speech engine 102 generates the plurality of test command audio files using one or more resources to provide different variations of each voice command input. In this embodiment, voice processing testing system 100 includes a thesaurus 608, an audio overlays module 610, and an analog signal processing module 612 that may be used by text-to-speech engine 102 as resources for generating the plurality of test command audio files. For example, thesaurus 608 may be used to substitute one or more words associated with a voice command input, audio overlays module 610 may be used to add various audio overlays that include different types and/or levels of background noise, and analog signal processing module 612 may be used to apply various types of analog signal processing to a test command audio file to change or modify at least one audio characteristic, such as changes in volume or pitch, adding echo or reverberation, or other distortion effects that may be simulated for a speaker or microphone.

Additionally, database 614 of voice processing testing system 100 may be used to store data associated with any of the operations of voice processing testing system 100 described herein. For example, database 614 may be used to store one or more of test inputs 130, including the plurality of voice command inputs and/or the plurality of expected responses, the plurality of test command audio files, test results 132, as well as used for purposes of machine learning or other uses by voice processing testing system 100.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method for testing a voice processing system, the method comprising:
   receiving, at a voice processing testing system, a plurality of voice command inputs and a plurality of expected responses associated with the plurality of voice command inputs;
   applying a text-to-speech engine to the plurality of voice command inputs, at the voice processing testing system, to generate a plurality of test command audio files;
   providing the plurality of test command audio files from the voice processing testing system to a testing apparatus in communication with a voice processing system, wherein the testing apparatus is located between the voice processing testing system and the voice processing system and performs bidirectional communication between the voice processing testing system and the voice processing system;
   obtaining, at the voice processing testing system from the testing apparatus, a generated response output from the voice processing system for each of the plurality of test command audio files, wherein the generated response is captured from the testing apparatus using at least one sensor of the voice processing testing system that is configured to detect audio and/or visual information from the testing apparatus;
   comparing, by the voice processing testing system, the obtained generated response to an expected response from the plurality of expected responses for each of the plurality of test command audio files; and
   based on the comparison, providing, by the voice processing testing system a test result for each of the plurality of voice command inputs.

2. The method of claim 1, wherein each voice command input is associated with a plurality of test command audio files for that voice command input.

3. The method of claim 1, wherein applying the text-to-speech engine to the plurality of voice command inputs further comprises at least one of:
   substituting one or more words associated with a voice command input;
   adding an audio overlay including background noise to a test command audio file; or
   applying analog signal processing to a test command audio file to change or modify at least one characteristic of the test command audio file.

4. The method of claim 1, wherein the at least one sensor of the voice processing testing system configured to detect audio and/or visual information from the testing apparatus is physically separated from the testing apparatus.

5. The method of claim 1, wherein the at least one sensor comprises a camera and/or a microphone.

6. The method of claim 1, wherein the provided test result comprises one of a correct result or an incorrect result.

7. The method of claim 1, wherein comparing the obtained generated response further comprises applying machine learning techniques to the plurality of expected responses to generate additional acceptable responses.

8. A voice processing testing system for testing a voice processing system, the system comprising:
   at least one sensor configured to detect audio and/or visual information from a testing apparatus;

a memory; and a processor in communication with the at least one sensor and the memory, wherein the processor is configured to:

receive, at the voice processing testing system, a plurality of voice command inputs and a plurality of expected responses associated with the plurality of voice command inputs;

apply, at the voice processing testing system, a text-to-speech engine to the plurality of voice command inputs to generate a plurality of test command audio files;

provide the plurality of test command audio files from the voice processing testing system to the testing apparatus in communication with a voice processing system, wherein the testing apparatus is located between the voice processing testing system and the voice processing system and performs bidirectional communication between the voice processing testing system and the voice processing system;

obtain, at the voice processing testing system from the testing apparatus, a generated response output from the voice processing system for each of the plurality of test command audio files, wherein the generated response is captured from the testing apparatus using at least one sensor of the voice processing testing system;

compare, by the voice processing testing system, the obtained generated response to an expected response from the plurality of expected responses for each of the plurality of test command audio files; and based on the comparison, provide, by the voice processing testing system, a test result for each of the plurality of voice command inputs.

9. The system of claim 8, wherein each voice command input is associated with a plurality of test command audio files for that voice command input.

10. The system of claim 8, wherein applying the text-to-speech engine to the plurality of voice command inputs by the processor includes at least one of:

substituting one or more words associated with a voice command input;

adding an audio overlay including background noise to a test command audio file; or applying analog signal processing to a test command audio file to change or modify at least one characteristic of the test command audio file.

11. The system of claim 8, wherein the at least one sensor configured to detect audio and/or visual information from the testing apparatus is physically separated from the testing apparatus.

12. The system of claim 8, wherein the at least one sensor comprises a camera and/or a microphone.

13. The system of claim 8, wherein the provided test result comprises one of a correct result or an incorrect result.

14. The system of claim 8, wherein comparing the obtained generated response by the processor includes applying machine learning techniques to the plurality of expected responses to generate additional acceptable responses.

15. One or more non-transitory computer readable storage media encoded with instructions that, when executed by a processor of a voice processing testing system, causes the processor to:

receive, at the voice processing testing system, a plurality of voice command inputs and a plurality of expected responses associated with the plurality of voice command inputs;

apply a text-to-speech engine to the plurality of voice command inputs, at the voice processing testing system, to generate a plurality of test command audio files;

provide the plurality of test command audio files from the voice processing testing system to a testing apparatus in communication with a voice processing system, wherein the testing apparatus is located between the voice processing testing system and the voice processing system and performs bidirectional communication between the voice processing testing system and the voice processing system;

obtain, at the voice processing testing system from the testing apparatus, a generated response output from the voice processing system for each of the plurality of test command audio files, wherein the generated response is captured from the testing apparatus using at least one sensor of the voice processing testing system that is configured to detect audio and/or visual information from the testing apparatus;

compare, by the voice processing testing system, the obtained generated response to an expected response from the plurality of expected responses for each of the plurality of test command audio files; and based on the comparison, provide, by the voice processing testing system, a test result for each of the plurality of voice command inputs.

16. The non-transitory computer readable storage media of claim 15, wherein each voice command input is associated with a plurality of test command audio files for that voice command input.

17. The non-transitory computer readable storage media of claim 15, wherein the instructions for applying the text-to-speech engine to the plurality of voice command inputs further causes the processor to perform at least one:

substituting one or more words associated with a voice command input;

adding an audio overlay including background noise to a test command audio file; or applying analog signal processing to a test command audio file to change or modify at least one characteristic of the test command audio file.

18. The non-transitory computer readable storage media of claim 15, wherein the at least one sensor configured to detect audio and/or visual information from the testing apparatus is physically separated from the testing apparatus.

19. The non-transitory computer readable storage media of claim 15, wherein the at least one sensor comprises a camera and/or a microphone.

20. The non-transitory computer readable storage media of claim 15, wherein the instructions for comparing the obtained generated response further causes the processor to apply machine learning techniques to the plurality of expected responses to generate additional acceptable responses.

* * * * *